United States Patent
McMillen et al.

(10) Patent No.: US 9,822,260 B2
(45) Date of Patent: Nov. 21, 2017

(54) PRETREATMENT COMPOSITIONS AND METHODS FOR COATING A METAL SUBSTRATE

(71) Applicant: PPG Industries Ohio, Inc., Cleveland, OH (US)

(72) Inventors: Mark W. McMillen, Cabot, PA (US); Edward F. Rakiewicz, Gibsonia, PA (US); Mark W. Simpson, Warren, MI (US); James A DeChant, North Olmsted, OH (US)

(73) Assignee: PPG Industries Ohio, Inc., Cleveland, OH (US)

(*) Notice: Subject to any disclaimer, the term of this patent is extended or adjusted under 35 U.S.C. 154(b) by 12 days.

(21) Appl. No.: 14/307,521

(22) Filed: Jun. 18, 2014

(65) Prior Publication Data

US 2014/0305803 A1    Oct. 16, 2014

Related U.S. Application Data

(62) Division of application No. 13/007,757, filed on Jan. 17, 2011, now abandoned.

(51) Int. Cl.

| | | |
|---|---|---|
| *C23C 22/34* | (2006.01) | |
| *C25D 5/34* | (2006.01) | |
| *C09D 5/24* | (2006.01) | |
| *C23C 22/36* | (2006.01) | |
| *C23C 22/83* | (2006.01) | |
| *C25D 13/20* | (2006.01) | |
| *B05D 3/10* | (2006.01) | |
| *C23C 28/00* | (2006.01) | |
| *C22C 1/02* | (2006.01) | |
| *C23C 22/00* | (2006.01) | |

(52) U.S. Cl.
CPC ............... *C09D 5/24* (2013.01); *B05D 3/102* (2013.01); *C22C 1/02* (2013.01); *C23C 22/34* (2013.01); *C23C 22/361* (2013.01); *C23C 22/83* (2013.01); *C23C 28/00* (2013.01); *C25D 13/20* (2013.01); *Y10T 428/12778* (2015.01); *Y10T 428/12806* (2015.01)

(58) Field of Classification Search
CPC ....... C23C 22/34; C23C 22/361; C23C 22/83; C25D 13/20; B05D 3/102
USPC ........................................................ 148/247
See application file for complete search history.

(56) References Cited

U.S. PATENT DOCUMENTS

| | | |
|---|---|---|
| 4,370,177 A | 1/1983 | Frelin et al. |
| 4,391,652 A * | 7/1983 | Das ............. C23C 22/361 148/247 |
| 5,149,382 A | 9/1992 | Gray |
| 5,209,788 A | 5/1993 | McMillen et al. |
| 5,653,823 A | 8/1997 | McMillen et al. |
| 6,419,731 B2 | 7/2002 | Inbe et al. |
| 7,510,612 B2 | 3/2009 | Matsukawa et al. |
| 7,531,051 B2 | 5/2009 | Nakayama |
| 2005/0067057 A1 | 3/2005 | Ishikura et al. |
| 2008/0286470 A1 | 11/2008 | Maksukawa et al. |
| 2008/0302448 A1 | 12/2008 | Frey et al. |
| 2009/0032144 A1 | 2/2009 | McMillen et al. |
| 2009/0084682 A1 | 4/2009 | McMillen et al. |
| 2010/0038250 A1 | 2/2010 | Matsukawa et al. |
| 2011/0041957 A1 | 2/2011 | Brouwer et al. |

FOREIGN PATENT DOCUMENTS

| | | | |
|---|---|---|---|
| EP | 2302098 | 6/2009 | |
| JP | 55-15976 | * 2/1980 | ............... C01B 7/19 |

* cited by examiner

Primary Examiner — Lois Zheng
(74) Attorney, Agent, or Firm — Alicia M. Passerin, Esq.

(57) ABSTRACT

Disclosed are pretreatment compositions and associated methods for treating metal substrates with pretreatment compositions, including ferrous substrates, such as cold rolled steel and electrogalvanized steel. The pretreatment composition includes: (a) a group IIIB and/or IVB metal; (b) free fluorine; (c) a source of aluminum ions; and (d) water. The methods include contacting the metal substrates with the pretreatment composition.

9 Claims, No Drawings

PRETREATMENT COMPOSITIONS AND METHODS FOR COATING A METAL SUBSTRATE

CROSS-REFERENCE TO RELATED APPLICATION

This application is a divisional application of U.S. patent application Ser. No. 13/007,757 filed Jan. 17, 2011.

FIELD OF THE INVENTION

The present invention relates to pretreatment compositions and methods for coating a metal substrate, including ferrous substrates, such as cold rolled steel and electrogalvanized steel. The present invention also relates to coated metal substrates.

BACKGROUND INFORMATION

The use of protective coatings on metal substrates for improved corrosion resistance and paint adhesion is common. Conventional techniques for coating such substrates include techniques that involve pretreating the metal substrate with a phosphate conversion coating and chrome-containing rinses. The use of such phosphate and/or chromate-containing compositions, however, imparts environmental and health concerns.

As a result, chromate-free and/or phosphate-free pretreatment compositions have been developed. Such compositions are generally based on chemical mixtures that in some way react with the substrate surface and bind to it to form a protective layer. For example, pretreatment compositions based on a group IIIB or IVB metal compound have recently become more prevalent. Such compositions often contain a source of free fluorine, i.e., fluorine that is isolated in the pretreatment composition as opposed to fluorine that is bound to another element, such as the group IIIB or IVB metal. Free fluorine can etch the surface of the metal substrate, thereby promoting deposition of a group IIIB or IVB metal coating. Nevertheless, the corrosion resistance capability of these pretreatment compositions has generally been significantly inferior to conventional phosphate and/or chromium containing pretreatments.

As a result, it would be desirable to provide methods for treating a metal substrate that overcome at least some of the previously described drawbacks of the prior art, including the environmental drawbacks associated with the use of chromates and/or phosphates. Moreover, it would be desirable to provide methods for treating metal substrate that, in at least some cases, imparts corrosion resistance properties that are equivalent to, or even superior to, the corrosion resistance properties imparted through the use of phosphate conversion coatings. It would also be desirable to provide related coated metal substrates.

SUMMARY OF THE INVENTION

In certain respects, the present invention is directed to compositions for treating a metal substrate. These compositions comprise: (a) a group IIIB and/or IVB metal; (b) an electropositive metal; (c) free fluorine; (d) a source of aluminum ions; and (e) water. The composition, in certain embodiments, is substantially free of heavy metal phosphate, such as zinc phosphate, and chromate. Moreover, the source of aluminum ions is supplied in an amount sufficient to maintain the level of free fluorine in the composition to no less than 0.1 parts per million ("ppm") and no more than 750 ppm.

In still other respects, the present invention is directed to methods for treating a metal substrate comprising cleaning the substrate and contacting the substrate with a pretreatment composition comprising: (a) a group IIIB and/or IVB metal; (b) an electropositive metal; (c) free fluorine; (d) a source of aluminum ions; and (e) water, wherein the amount of aluminum ions supplied in an amount sufficient to maintain the level of free fluorine in the composition to no less than 0.1 ppm and no more than 750 ppm.

The present invention is also directed to substrates treated thereby.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for treating a metal substrate. Suitable metal substrates for use in the present invention include those that are often used in the assembly of automotive bodies, automotive parts, and other articles, such as small metal parts, including fasteners, i.e., nuts, bolts, screws, pins, nails, clips, buttons, and the like. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. Moreover, the metal substrate being treated by the methods of the present invention may be a cut edge of a substrate that is otherwise treated and/or coated over the rest of its surface. The metal substrate treated in accordance with the methods of the present invention may be in the form of, for example, a sheet of metal or a fabricated part.

The substrate to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include Chemkleen 163, Chemkleen 177, Chemkleen 490MX, Chemkleen 2010LP, Chemkleen 166 HP, and Chemkleen 166 M, each of which are commercially available from PPG Industries, Inc. Such cleaners are often followed and/or preceded by a water rinse.

Next, in some embodiments, an optional pre-rinse composition comprising an electropositive metal is deposited onto at least a portion of the metal substrate. As used herein, the term "electropositive metal" refers to metals that are more electropositive than the metal substrate. This means that, for purposes of the present invention, the term "electropositive metal" encompasses metals that are less easily oxidized than the metal of the metal substrate that is being treated. As will be appreciated by those skilled in the art, the tendency of a metal to be oxidized is called the oxidation potential, is expressed in volts, and is measured relative to a standard hydrogen electrode, which is arbitrarily assigned an oxidation potential of zero. The oxidation potential for several elements is set forth in the table below. An element is less easily oxidized than another element if it has a voltage value, E*, in the following table, that is greater than the element to which it is being compared.

| Element | Half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.44 |
| Nickel | $Ni^{2+} + 2e \rightarrow Ni$ | −0.25 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.79 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvanealed steel, steel plated with zinc alloy, aluminum alloys, aluminum plated steel, aluminum alloy plated steel, magnesium and magnesium alloys, suitable electropositive metals for deposition thereon include, for example, nickel, copper, silver, and gold, as well mixtures thereof.

As indicated, in certain embodiments of the present invention, an electropositive metal is first deposited on the substrate. Any suitable technique may be used to accomplish this deposition, however, in certain embodiments, the deposition is accomplished without the use of electric current. In particular, in certain embodiments, the electropositive metal is deposited by contacting the substrate with a plating solution of a soluble metal salt, such as a soluble copper salt, wherein the metal of the substrate dissolves while the metal in the solution, such as copper, is plated out onto the substrate surface.

The plating solution referenced above is often an aqueous solution of a water soluble metal salt. In certain embodiments of the present invention, the water soluble metal salt is a water soluble copper compound. Specific examples of water soluble copper compounds, which are suitable for use in the present invention include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be preferable to add a complexing agent that suppresses the precipitation of copper ions, thus stabilizing them as a copper complex in the solution.

In certain embodiments, the copper compound is added as a copper complex salt such as $K_3Cu(CN)_4$ or Cu-EDTA, which can be present stably in the composition on its own, but it is also possible to form a copper complex that can be present stably in the composition by combining a complexing agent with a compound that is difficulty soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA•2Na.

With regard to the complexing agent, a compound that can form a complex with copper ions can be used; examples thereof include organic compounds, such as cyanide compounds and thiocyanate compounds, and polycarboxylic acids, and specific examples thereof include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

In certain embodiments, the electropositive metal, such as copper, is included in the plating solution in an amount of at least 1 ppm, such as at least 50 ppm, or in some cases, at least 100 ppm of total metal (measured as elemental metal). In certain embodiments, the electropositive metal, such as copper, is included in such plating solutions in an amount of no more than 5000 ppm, such as no more than 1000 ppm, or in some cases, no more than 500 ppm of total metal (measured as elemental metal). The amount of electropositive metal in the plating solution can range between the recited values inclusive of the recited values.

In addition to the water soluble metal salt and optional complexing agent, the plating solution utilized in certain embodiments of the present invention may also include other additives. For example, a stabilizer, such as an azole, such as 2-mercaptobenzothiazole, may be used. Other optional materials include surfactants that function as defoamers or substrate wetting agents. Anionic, cationic, amphoteric, or nonionic surfactants may be used. Compatible mixtures of such materials are also suitable. Defoaming surfactants are often present at levels up to 1 percent, such as up to 0.1 percent by volume, and wetting agents are often present at levels up to 2 percent, such as up to 0.5 percent by volume, based on the total volume of the solution.

In certain embodiments, the aqueous plating solution utilized in certain embodiments of the present invention has a pH at application of less than 7, in some cases the pH is within the range of 1 to 6, such as 1.5 to 5.5. In certain embodiments, the pH of the solution is maintained through the inclusion of an acid. The pH of the solution may be adjusted using mineral acids, such as hydrofluoric acid, fluoroboric acid and phosphoric acid, including mixtures thereof; organic acids, such as lactic acid, acetic acid, citric acid, sulfamic acid, or mixtures thereof; and water soluble or water dispersible bases, such as sodium hydroxide, ammonium hydroxide, ammonia, or amines such as triethylamine, methylethyl amine, or mixtures thereof. The pH may also be adjusted using inorganic acids such as, for example, sulfuric acid, hydrochloric acid, and/or nitric acid.

The plating solution may be brought into contact with the substrate by any of a variety of techniques, including, for example, dipping or immersion, spraying, intermittent spraying, dipping followed by spraying, spraying followed by dipping, brushing, or roll-coating. In certain embodiments, a dipping or immersion technique is used and the solution, when applied to the metal substrate, is at a temperature ranging from 60 to 185° F. (15 to 85° C.). The contact time is often from 10 seconds to five minutes, such as 30 seconds to 2 minutes. After removal of the substrate from the plating solution, the substrate may, if desired, be rinsed with water and dried.

In certain embodiments, the residue of the plating solution, i.e., the electropositive metal, is present on the substrate in an amount ranging from 1 to 1000 milligrams per square meter ($mg/m^2$), such as 10 to 400 $mg/m^2$. The thickness of the residue of the plating solution can vary, but it is generally very thin, often having a thickness of less than 1 micrometer, in some cases it is from 1 to 500 nanometers, and, in yet other cases, it is 10 to 300 nanometers.

In another alternative embodiment, the optional pre-rinse composition may comprise an acid cleaner solution without an electropositive metal. In certain embodiments, the acid cleaner solution utilized in certain embodiments of the present invention has a pH at application of less than 7, in some cases the pH is within the range of 1 to 6, such as 1.5 to 5.5. The pH of the solution may be adjusted using mineral acids, such as hydrofluoric acid, fluoroboric acid and phosphoric acid, including mixtures thereof; organic acids, such as lactic acid, acetic acid, citric acid, sulfamic acid, or mixtures thereof; and water soluble or water dispersible bases, such as sodium hydroxide, ammonium hydroxide, ammonia, or amines such as triethylamine, methylethyl amine, or mixtures thereof. The pH may also be adjusted using inorganic acids such as, for example, sulfuric acid, hydrochloric acid, and/or nitric acid.

The acid cleaner solution may be brought into contact with the substrate by any of a variety of techniques, including, for example, dipping or immersion, spraying, intermittent spraying, dipping followed by spraying, spraying followed by dipping, brushing, or roll-coating. In certain embodiments, a dipping or immersion technique is used and the solution, when applied to the metal substrate, is at a temperature ranging from 60 to 185° F. (15 to 85° C.). The contact time is often from 10 seconds to five minutes, such as 30 seconds to 2 minutes. After removal of the substrate from the acid cleaner solution, the substrate may, if desired, be rinsed with water and dried.

Next, as previously indicated, certain embodiments of the present invention are directed to methods treating a metal substrate, with or without the optional pre-rinse, that comprise contacting the metal substrate with a pretreatment composition comprising a group IIIB and/or IVB metal. As used herein, the term "pretreatment composition" refers to a composition that, upon contact with the substrate, reacts with and chemically alters the substrate surface and binds to it to form a protective layer.

Often, the pretreatment composition comprises a carrier, often an aqueous medium, so that the composition is in the form of a solution or dispersion of a group IIIB or IVB metal compound in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. In certain embodiments, the solution or dispersion when applied to the metal substrate is at a temperature ranging from 60 to 150° F. (15 to 65° C.). The contact time is often from 10 seconds to five minutes, such as 30 seconds to 2 minutes.

As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used. In certain embodiments, a group IIIB and/or IVB metal compound is used. As used herein, the term "group IIIB and/or IVB metal compound" refers to compounds that include at least one element that is in group IIIB or group IVB of the CAS Periodic Table of the Elements.

In certain embodiments, the group IIIB and/or IVB metal compound used in the pretreatment composition is a compound of zirconium, titanium, hafnium, yttrium, cerium, or a mixture thereof. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. A suitable compound of yttrium includes, but is not limited to, yttrium nitrate. A suitable compound of cerium includes, but is not limited to, cerous nitrate.

In certain embodiments, the group IIIB and/or IVB metal compound is present in the pretreatment composition in an amount of at least 10 ppm metal, such as at least 25 ppm metal, or, in some cases, at least 100 ppm metal (measured as elemental metal). In certain embodiments, the group IIIB and/or IVB metal compound is present in the pretreatment composition in an amount of no more than 5000 ppm metal, such as no more than 300 ppm metal, or, in some cases, no more than 250 ppm metal (measured as elemental metal). The amount of group IIIB and/or IVB metal in the pretreatment composition can range between the recited values inclusive of the recited values.

In certain embodiments, the pretreatment composition also comprises an electropositive metal, such as copper. The source of electropositive metal, such as copper, in the pretreatment composition may comprise, for example, any of the materials described earlier with respect to the plating solution. In certain embodiments, the electropositive metal, such as copper, is included in the pretreatment compositions in an amount of at least 1 ppm, such as at least 5 ppm, or in some cases, at least 10 ppm of total metal (measured as elemental metal). In certain embodiments, the electropositive metal is included in such pretreatment compositions in an amount of no more than 500 ppm, such as no more than 300 ppm, or in some cases, no more than 50 ppm of total metal (measured as elemental metal). The amount of electropositive metal in the pretreatment composition can range between the recited values inclusive of the recited values.

The pretreatment compositions of the present invention also comprise free fluorine. As will be appreciated, the source of free fluorine in the pretreatment compositions of the present invention can vary. For example, in some cases, the free fluorine may derive from the group IIIB and/or IVB metal compound used in the pretreatment composition, such as is the case, for example, with hexafluorozirconic acid. As the group IIIB and/or IVB metal is deposited upon the metal substrate during the pretreatment process, fluorine in the hexafluorozirconic acid will become free fluorine and, as will be appreciated, the level of free fluorine in the pretreatment composition will, if left unchecked, increase with time as metal is pretreated with the pretreatment composition of the present invention.

In addition, the source of free fluorine in the pretreatment compositions of the present invention may include a compound other than the group IIIB and/or IVB metal compound. Non-limiting examples of such sources include HF, $NH_4F$, $NH_4HF_2$, NaF, and $NaHF_2$.

As used herein, the term "free fluorine" refers to isolated fluorine ion and its concentration in the pretreatment compositions of the present invention can be determined by measuring a pretreatment composition by a meter with a fluorine ion electrode. The Examples herein illustrate a suitable method for determining the concentration of free fluorine in a composition for purposes of the present invention.

The pretreatment compositions of the present invention also comprise a source of aluminum ions. Moreover, in the compositions of the present invention, the amount of aluminum ions in the source of aluminum ions is selected such that the level of free fluorine in the composition is no less than 0.1 ppm, in some cases no less than 20 ppm, and no more than 750 ppm, in some cases no more than 300 ppm. As will be appreciated, and as was previously mentioned, the level of free fluorine in the pretreatment compositions of the present invention will increase over time as metal is pretreated therewith. In the present invention, the source of aluminum ions as described above is supplied to the pretreatment composition as needed to maintain the level of free fluorine at no less than 0.1 ppm and no more than 750 ppm in the pretreatment composition.

Exemplary sources for aluminum ions that may be used include aluminum compounds that are soluble in the water component of the pretreatment composition (i.e. a water soluble aluminum compound). Such water soluble aluminum compounds include aluminum sulfate, ammonium aluminum sulfate, potassium aluminum sulfate, sodium aluminum sulfate, aluminum nitrate, aluminum chloride, aluminum acetate, aluminum citrate, aluminum bromide, aluminum bromate, aluminum lactate, aluminum chlorate, aluminum tartrate, aluminum thiocyanate, aluminum hydroxychloride, aluminum formate, aluminum hydroxyacetate, aluminum malate, aluminum succinate, aluminum gluconate, aluminum glutamate, aluminum glycinate, aluminum fumarate, and their respective hydrated forms.

Another exemplary source for aluminum ions are aluminum compounds of limited solubility in the water component of the pretreatment composition but nevertheless may be able to provide aluminum ion under some circumstances. Exemplary aluminum compounds having limited solubility in water but may be utilized include aluminum oxide, aluminum hydroxide, aluminum ferricyanide, aluminum phosphate, aluminum silicate, various aluminum-containing clays and zeolites, various aluminum soaps and salts of fatty acids.

In certain embodiments, a compound that can form a complex with the source of aluminum ions can be used. The complexed aluminum is then added to the pretreatment composition. Examples of these complexing compounds include organic compounds such as polycarboxylic acids and/or aminocarboxylic acids. Examples of suitable polycarboxylic acids that may be used in the present invention include oxycarboxylic acids, such as citric acid and tartaric acid, succinic acid, oxalic acid, ethylenediaminetetramethylenephosphonic acid, and glycine. Examples of suitable aminocarboxylic acids that may be used in the present invention include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

In certain embodiments, the pH of the pretreatment composition ranges from 2.0 to 7.0, such as 3.5 to 5.5. The pH of the pretreatment composition may be adjusted using, for example, any acid or base as is necessary. In certain embodiments, the pH of the solution is maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

In certain embodiments, the pretreatment composition comprises a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids as disclosed in U.S. Pat. Nos.

3,912,548 and 5,328,525; phenol formaldehyde resins as described in U.S. Pat. No. 5,662,746; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In these embodiments of the present invention, the resinous binder is present in the pretreatment composition in an amount of 0.005 percent to 30 percent by weight, such as 0.5 to 3 percent by weight, based on the total weight of the ingredients in the composition.

In other embodiments, however, the pretreatment composition is substantially free or, in some cases, completely free of any resinous binder. As used herein, the term "substantially free", when used with reference to the absence of resinous binder in the pretreatment composition, means that any resinous binder is present in the pretreatment composition in an amount of less than 0.005 percent by weight. As used herein, the term "completely free" means that there is no resinous binder in the pretreatment composition at all.

The pretreatment composition may optionally contain other materials, such as nonionic surfactants and auxiliaries conventionally used in the art of pretreatment. In an aqueous medium, water dispersible organic solvents, for example, alcohols with up to about 8 carbon atoms, such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents.

In certain embodiments, the pretreatment composition also comprises a reaction accelerator, such as nitrite ions, nitrate ions, nitro-group containing compounds, hydroxylamine sulfate, persulfate ions, sulfite ions, hyposulfite ions, peroxides, iron (III) ions, citric acid iron compounds, bromate ions, perchlorinate ions, chlorate ions, chlorite ions as well as ascorbic acid, citric acid, tartaric acid, malonic acid, succinic acid and salts thereof. Specific examples of suitable materials and their amounts are described in U.S. Patent Application Publication No. 2004/0163736 A1 at [0032] to [0041], the cited portion of which being incorporated herein by reference.

In certain embodiments, the pretreatment composition also comprises filler, such as siliceous filler. Non-limiting examples of suitable fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Examples of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate.

In certain embodiments, the pretreatment composition comprises phosphate ions. In certain embodiments, phosphate ions are present in an amount of 1 to 500 ppm of phosphate ion, such as 10 to 200 ppm phosphate ion. Exemplary sources of phosphate ion include $H_3PO_4$, $NaH_2PO_4$, and/or $(NH_4)H_2PO_4$. In certain embodiments, however, the pretreatment composition of the present invention is substantially or, in some cases, completely free of phosphate ion. As used herein, the term "substantially free" when used in reference to the absence of phosphate ion in the pretreatment composition, means that phosphate ion is present in the composition in an amount less than 10 ppm. As used herein, the term "completely free", when used with reference to the absence of phosphate ions, means that there are no phosphate ions in the composition at all.

In certain embodiments, the pretreatment composition is substantially or, in some cases, completely free of chromate and/or heavy metal phosphate, such as zinc phosphate. As used herein, the term "substantially free" when used in reference to the absence of chromate and/or heavy metal phosphate in the pretreatment composition, means that these substances are not present in the composition to such an extent that they cause a burden on the environment. That is, they are not substantially used and the formation of sludge, such as zinc phosphate, formed in the case of using a treating agent based on zinc phosphate, is eliminated. As used herein, the term "completely free", when used with reference to the absence of a heavy metal phosphate and/or chromate, means that there is no heavy metal phosphate and/or chromate in the composition at all.

Moreover, in certain embodiments, the pretreatment composition is substantially free, or, in some cases, completely free of any organic materials. As used herein, the term "substantially free", when used with reference to the absence of organic materials in the composition, means that any organic materials are present in the composition, if at all, as an incidental impurity. In other words, the presence of any organic material does not affect the properties of the composition. As used herein, the term "completely free", when used with reference to the absence of organic material, means that there is no organic material in the composition at all.

In certain embodiments, the film coverage of the residue of the pretreatment coating composition generally ranges from 1 to 1000 milligrams per square meter ($mg/m^2$), such as 10 to 400 $mg/m^2$. The thickness of the pretreatment coating can vary, but it is generally very thin, often having a thickness of less than 1 micrometer, in some cases it is from 1 to 500 nanometers, and, in yet other cases, it is 10 to 300 nanometers.

Following contact with the pretreatment solution, the substrate optionally may be rinsed with water and dried.

Optionally, after the pretreatment step, the substrate may then be contacted with a post-rinse solution. Post-rinse solutions, in general, utilize certain solubilized metal ions or other inorganic materials (such as phosphates or simple or complex fluorides) to enhance the corrosion protection of pretreated metal substrates. These post-rinse solutions may be chrome containing or non-chrome containing post-rinse solutions. Suitable non-chrome post-rinse solutions that may be utilized in the present invention are disclosed in U.S. Pat. Nos. 5,653,823; 5,209,788; and 5,149,382; all assigned to PPG Industries, Inc. and herein incorporated by reference. In addition, organic materials (resinous or otherwise) such as phosphitized epoxies, base-solubilized, carboxylic acid containing polymers, at least partially neutralized interpolymers of hydroxyl-alkyl esters of unsaturated carboxylic acids, and amine salt-group containing resins (such as acid-solubilized reaction products of polyepoxides and primary or secondary amines) may also be utilized alone or in combination with solubilized metal ions and/or other inorganic materials.

After the optional post-rinse (when utilized), the substrate may be rinsed with water prior to subsequent processing.

In certain embodiments of the methods of the present invention, after the substrate is contacted with the pretreatment composition, it is then contacted with a coating composition comprising a film-forming resin. Any suitable technique may be used to contact the substrate with such a coating composition, including, for example, brushing, dipping, flow coating, spraying and the like. In certain embodiments, however, as described in more detail below, such contacting comprises an electrocoating step wherein an electrodepositable composition is deposited onto the metal substrate by electrodeposition.

As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others.

In certain embodiments, the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or cross-linking reactions also may be carried out under ambient conditions. Once cured or crosslinked, a thermosetting resin will not melt upon the application of heat and is insoluble in solvents. In other embodiments, the coating composition comprises a thermoplastic film-forming resin. As used herein, the term "thermoplastic" refers to resins that comprise polymeric components that are not joined by covalent bonds and thereby can undergo liquid flow upon heating and are soluble in solvents.

As previously indicated, in certain embodiments, the substrate is contacted with a coating composition comprising a film-forming resin by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and U.S. Pat. No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

In certain embodiments, the coating composition comprising a film-forming resin also comprises yttrium. In certain embodiments, yttrium is present in such compositions in an amount from 10 to 10,000 ppm, such as not more than 5,000 ppm, and, in some cases, not more than 1,000 ppm, of total yttrium (measured as elemental yttrium).

Both soluble and insoluble yttrium compounds may serve as the source of yttrium. Examples of yttrium sources suitable for use in lead-free electrodepositable coating compositions are soluble organic and inorganic yttrium salts such as yttrium acetate, yttrium chloride, yttrium formate, yttrium carbonate, yttrium sulfamate, yttrium lactate and yttrium nitrate. When the yttrium is to be added to an electrocoat bath as an aqueous solution, yttrium nitrate, a readily available yttrium compound, is a preferred yttrium source. Other yttrium compounds suitable for use in electrodepositable compositions are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. When the yttrium is to be incorporated into an electrocoat bath as a component in the pigment paste, yttrium oxide is often the preferred source of yttrium.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more colorants (described below), a water-dispersible grind resin which can be the same or different from the main-film forming polymer, and, optionally, additives such as wetting or dispersing aids.

Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the coating composition comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

After deposition, the coating is often heated to cure the deposited composition. The heating or curing operation is often carried out at a temperature in the range of from 120 to 250° C., such as from 120 to 190° C., for a period of time ranging from 10 to 60 minutes. In certain embodiments, the thickness of the resultant film is from 10 to 50 microns.

As will be appreciated by the foregoing description, the present invention is directed to compositions for treating a metal substrate. These compositions comprise: (a) a group IIIB and/or IVB metal; (b) an electropositive metal; (c) free fluorine; (d) a source of aluminum ions; and (e) water. The composition, in certain embodiments, is substantially free of heavy metal phosphate, such as zinc phosphate, and chromate.

In yet other respects, the present invention is directed to compositions for treating a metal substrate that comprise: (a) a group IIIB and/or IVB metal; (b) 0.1 to 300 ppm of free fluorine; (c) a source of aluminum ions; and (d) water. These compositions of the present invention are substantially free of phosphate ions and chromate.

As has been indicated throughout the foregoing description, the methods and coated substrates of the present invention do not, in certain embodiments, include the deposition of a crystalline phosphate, such as zinc phosphate, or a chromate. As a result, the environmental drawbacks associated with such materials can be avoided. Nevertheless, the methods of the present invention have been shown to provide coated substrates that are, in at least some cases, resistant to corrosion at a level comparable to, in some cases even superior to, methods wherein such materials are used. This is a surprising and unexpected discovery of the present invention and satisfies a long felt need in the art.

Illustrating the invention are the following examples that are not to be considered as limiting the invention to their details. All parts and percentages in the examples, as well as throughout the specification, are by weight unless otherwise indicated.

EXAMPLES

Fluoride ion concentration, including both free and total fluoride, can be measured using a variety of methods familiar to those skilled in the art. Frequently, fluoride ion concentration is measured using an ion-selective electrode ("ISE"), such as the sympHony® Fluoride Ion Selective Combination Electrode supplied by VWR International, or similar electrodes. The fluoride ISE is standardized by immersing the electrode into solutions of known fluoride concentration and recording the reading in millivolts; then, plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly.

Fluoride ion is a small negative ion with a high charge density, so in aqueous solution it is frequently complexed with metal ions having a high positive charge density, such as zirconium or titanium, or with hydrogen ion. The fluoride ions thus complexed are not measurable with the fluoride ISE unless the solution they are present in is mixed with an ionic strength adjustment buffer that releases the fluoride ions from such complexes. At that point the fluoride ions are measurable by the fluoride ISE, and the measurement is known as "total fluoride". A fluoride measurement taken without using such a reagent is known as "free fluoride", since it is only the fluoride ion not bound with hydrogen ion or in metal complexes.

For purposes of the Examples that follow, the fluoride was measured as follows: The calibration standards were prepared by adding 2 mL each of standard solutions containing, respectively, 100 ppm, 300 ppm and 1000 ppm of fluoride ion, to 50 mL of an ionic strength adjustment buffer comprised of 10% by weight sodium citrate dihydrate (available from Aldrich Chemical, Milwaukee, Wis.) in deionized water. The millivolt reading of each of these standards were then measured with a fluoride ISE and used to construct a calibration curve as described above. For total fluoride values, 2 mL of the unknown solution was mixed with 50 mL of the sodium citrate buffer and the millivolt reading of the fluoride ISE of this solution was compared with the calibration curve generated to determine the total fluoride. Free fluoride was determined by directly reading the millivolts of the sample solution and comparing with the calibration curve, and then dividing this number by 26 (the division was necessary since the standards were diluted by a factor of 26 due to the ionic strength adjustment buffer, and the free fluoride sample was not).

Example 1

An 8 liter zirconium pretreatment bath was prepared using 7 grams of 45% Hexafluorozirconic acid (available from Honeywell, Inc.) and 0.87 g of a copper nitrate solution ($Cu(NO_3)_2 \cdot 2\frac{1}{2}H_2O$, available from Fisher Scientific). The bath pH was adjusted to 4.5 with Chemfil Buffer (available from PPG Industries) and heated to 100° F. (about 37.8° C.). The free fluoride of this pretreatment bath was measured at 20 ppm. A clean cold rolled steel panel was immersed in the pretreatment bath for two minutes, then rinsed with deionized water and dried. The zirconium pretreatment was measured on an XMet 3000 TX portable XRF (X-ray fluorescence) instrument that had been calibrated to measure approximate zirconium oxide thickness, and was found to be 70 nm.

To the zirconium pretreatment bath were added 12 g of Chemfos AFL, a free fluoride adjustment product (available from PPG Industries). The pH, which had dropped to 3.9 by the chemical addition, was adjusted back to 4.5 with addition of Chemfil Buffer. The free fluoride was measured at 114 ppm. A second clean steel panel was treated for two minutes and rinsed and dried. This panel was measured by the XMet XRF instrument and found to have 34 nm of zirconium oxide pretreatment.

Another 12 g addition of Chemfos AFL added to the bath. The pH was adjusted back to 4.5, and the free fluoride now measured 211 ppm. A clean steel panel treated for two minutes, rinsed and dried, now measured 22 nm of zirconium pretreatment thickness.

Another 12 g addition of Chemfos AFL, followed by subsequent pH adjustment to 4.5, increased the free fluoride to 297 ppm. A fourth steel panel was processed through this bath as previously described; this panel was measured at 11 nm.

Yet another addition of Chemfos AFL, followed by pH adjustment, increased the measured free fluoride to 430 ppm. A cleaned steel panel processed through the pretreatment bath at these conditions as describe above measured 4 nm of zirconium pretreatment. Thus, subsequent additions of free fluoride added artificially to the zirconium pretreatment bath caused the inhibition of zirconium pretreatment formation on the steel panels. Zirconium pretreatments such as those formed at the free fluoride levels of 211 ppm and higher, would provide unacceptable corrosion resistance.

A solution of was prepared to contain 18 g/L of aluminum ion by dissolving 250 g of an aluminum nitrate solution ($Al(NO_3)_3 \cdot 9H_2O$) into 1 L of total solution volume. This solution (the "aluminum solution", as described in subsequent paragraphs of this Example) was then introduced incrementally into the zirconium pretreatment bath. A 32 mL aliquot of the 18 g/L aluminum solution was added to the bath to give a nominal aluminum concentration of 48 ppm. The pH, which dropped to 4.3 upon addition of the aluminum solution, was adjusted to 4.5 with Chemfil butter. The free fluoride was measured at 274, and a cleaned steel panel treated for two minutes measured 22 nm of zirconium pretreatment thickness.

Another 31 mL of 18 g/L aluminum solution was added to the zirconium pretreatment bath, to give a nominal aluminum concentration of 94 ppm. The pH of the solution, which dropped to 4.3 upon addition of the aluminum solution, was adjusted to pH 4.5 with Chemfil Buffer. The free fluoride of this solution was measured at 154 ppm. A clean steel panel treated in this bath for two minutes as described above measured 32 nm of zirconium coating thickness.

Another 32 mL addition of the aluminum solution was made to the zirconium pretreatment bath, to give a nominal total of 142 ppm aluminum. The pretreatment bath pH was 4.5, and the free fluoride was measured at 34 ppm. A cleaned steel panel treated in the pretreatment bath as described above was measured at 62 nm of zirconium pretreatment thickness.

Thus, simulated bath aging of the zirconium pretreatment bath by the addition of free fluoride caused decreased zirconium pretreatment coating thickness, and the addition of soluble aluminum as the nitrate returned the performance of the bath to its initial condition.

Example 2

A 4 L zirconium pretreatment bath was prepared to contain 175 ppm zirconium (from fluorozirconic acid) and 20 ppm copper (from copper nitrate). The pH of the pretreatment bath was adjusted to 4.6 with Chemfil Buffer.

Next, metal panels were prepared for pretreatment in the zirconium pretreatment bath. The metal panels to be treated were 4"×6" panels purchased from ACT Laboratories, Inc. Before treating in the zirconium pretreatment bath, the panels were cleaned in a solution of Chemkleen 166HP, an alkaline cleaner available from PPG Industries, prepared according to the manufacturer's instructions, and then rinsed with deionized water. After the rinsing step, the panels were treated in the zirconium pretreatment bath for two minutes at 80° F. (about 26.7° C.) with mild agitation provided by an overhead mixer. Panels were processed two at a time. The composition of the panels processed in each group of twenty panels was 18 electrogalvanized steel panels, one cold rolled steel panel, and one aluminum alloy 6111 panel.

After each twenty panels, the chemical components of the bath were tested and the bath replenished using Zircobond R1, a zirconium pretreatment replenishment product available from PPG Industries. The pH was adjusted to 4.4-4.5 as necessary with Chemfil Buffer and free fluoride was measured. The bath was then adjusted with aluminum ion as necessary to maintain it between 40 and 70 ppm free fluoride. In this Example, the free fluoride was adjusted with an aluminum sulfate solution containing 4.4% by weight of aluminum (sold commercially as Liquid Alum, available from General Chemical). The process was continued until a total of 300 panels had been processed.

The fluoride control information appears in Table 1, below.

TABLE 1

| Panels treated | Free Fluoride (ppm) | Aluminum sulfate solution added (grams) | New Free Fluoride (ppm) |
|---|---|---|---|
| 0 | 22 | — | — |
| 20 | 46 | — | — |
| 40 | 65 | — | — |
| 60 | 78 | 0.78 | 60 |
| 80 | 64 | — | — |
| 100 | 98 | 1.64 | 53 |
| 120 | 75 | 0.65 | 57 |
| 140 | 77 | 0.73 | 60 |
| 160 | 80 | 0.9 | 58 |
| 180 | 71 | 0.48 | 61 |
| 200 | 78 | 0.77 | 55 |
| 220 | 71 | 0.48 | 63 |
| 240 | 80 | 0.87 | 63 |
| 260 | 78 | 0.78 | 63 |
| 280 | 73 | 0.57 | 62 |
| 300 | 80 | 0.86 | 61 |

Example 2 confirms that aluminum sulfate acts to control free fluoride levels in a pretreatment bath, similar to aluminum nitrate as described above in Example 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A method for controlling free fluoride in an aged bath containing a pretreatment composition comprising:
   contacting a substrate with the pretreatment composition comprising a group IIIB and/or IVB metal, an electropositive metal, free fluoride, and water;
   monitoring a level of free fluoride in the aged bath; and
   incrementally introducing a source of aluminum ions to the aged bath in an amount sufficient to maintain free fluoride in the pretreatment composition contained therein at no less than 0.1 ppm and no more than 750 ppm.

2. The method of claim 1, further comprising cleaning the metal substrate prior to the contacting step.

3. The method of claim 1, wherein the source of aluminum ions comprises a water soluble aluminum compound comprising one or more of aluminum sulfate, ammonium aluminum sulfate, potassium aluminum sulfate, sodium aluminum sulfate, aluminum nitrate, aluminum chloride, aluminum acetate, aluminum citrate, aluminum bromide, aluminum bromate, aluminum lactate, aluminum chlorate, aluminum tartrate, aluminum thiocyanate, aluminum hydroxychloride, aluminum formate, aluminum hydroxyacetate, aluminum malate, aluminum succinate, aluminum gluconate, aluminum glutamate, aluminum glycinate, aluminum fumarate, and their respective hydrated forms.

4. The method of claim 1, wherein the source of aluminum ions comprises one or more of aluminum oxide, aluminum hydroxide, aluminum ferricyanide, aluminum phosphate, aluminum silicate, aluminum-containing clays, aluminum-containing zeolites, aluminum soaps and salts of aluminum-containing fatty acids.

5. The method of claim 1, wherein the group IIIB and/or IVB metal is present in the pretreatment composition in an amount of at least 100 ppm metal.

6. The method of claim 1, wherein the electropositive metal is included in the pretreatment composition in an amount of at least 1 ppm of total metal measured as elemental metal.

7. The method of claim 1, wherein the source of aluminum ions is complexed with an organic compound.

8. The method of claim 7, wherein the organic compound comprises one or more of a polycarboxylic acid or an aminopolycarboxylic acid.

9. The method of claim 1, further comprising contacting the pretreated substrate with a coating composition comprising a film-forming resin, wherein the contacting comprises an electrocoating step wherein an electrodepositable composition is deposited onto the pretreated substrate by electrodeposition.

* * * * *